Nov. 22, 1949     E. G. ULRICH     2,488,750
TRUCK ANCHOR
Filed Sept. 27, 1945
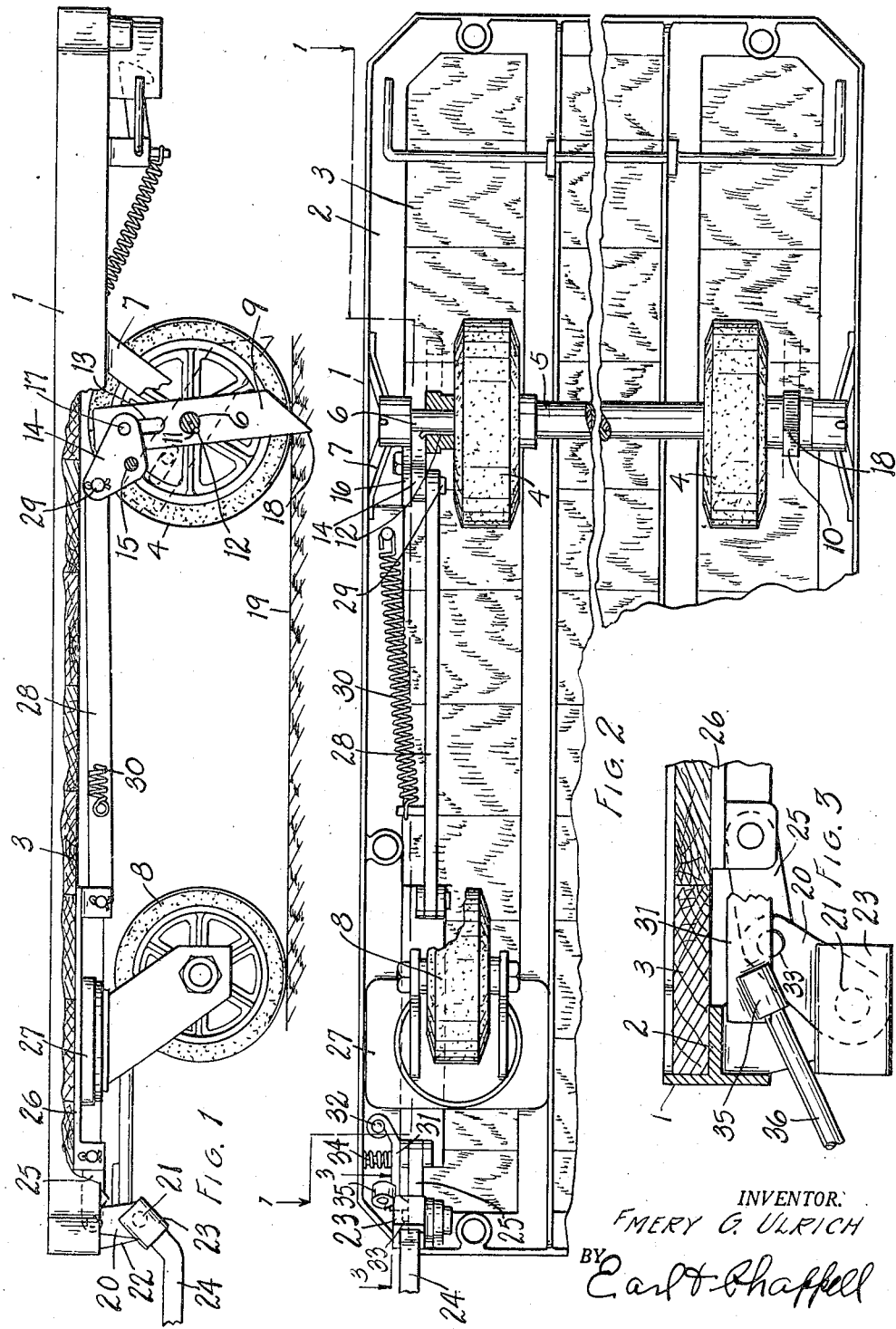
INVENTOR.
EMERY G. ULRICH
BY Earl F. Chappell
ATTORNEYS.

Patented Nov. 22, 1949

2,488,750

UNITED STATES PATENT OFFICE 2,488,750

TRUCK ANCHOR

Emery G. Ulrich, Toledo, Ohio; Vivian R. Ulrich, administratrix of said Emery G. Ulrich, deceased, assignor to Vivian R. Ulrich Application September 27, 1945, Serial No. 618,964

7 Claims. (Cl. 188—5)

This invention relates to improvements in truck anchor.

The main objects of this invention are:

First, to provide a truck embodying anchoring means which is well adapted for use in freight houses, warehouses, and the handling and shipping of freight and merchandise and which may be used in shipment in freight cars, the trucks being firmly anchored in the cars and thereby avoiding the necessity of unloading and reloading.

Second, to provide a structure having these advantages which is easily manipulated to anchor the truck, the mechanism being relatively simple and light in weight and at the same time strong and durable.

Objects pertaining to details and economies of the invention will definitely appear from the description to follow. The invention is defined in the claims.

A structure which embodies the features of the invention is clearly illustrated in the accompanying drawing, in which:

Fig. 1 is a fragmentary view partially in side elevation and partially in longitudinal section on a line corresponding to line 1—1 of Fig. 2.

Fig. 2 is an inverted fragmentary view.

Fig. 3 is an enlarged fragmentary view in section on line 3—3 of Fig. 2.

In the accompanying drawing I have illustrated the invention as embodied in a truck designed for the handling of freight and the like adapted to be run into freight cars for shipment of the freight or merchandise without unloading. However, it has wide adaptation for use on loading platforms, in freight houses, factories and other uses where it is desired to anchor the trucks. Trucks of this type are commonly provided with couplings or hitches enabling them to be coupled en train but I have not illustrated or described the details of that mechanism as it forms no part of the present invention.

The truck body 1 is shown mainly in conventional form comprising a suitable frame 2 with deck or top 3. The connections for the various body parts are not illustrated. Carrying wheels 4 are mounted on the axle sleeve 5, the axle 6 being rotatably or rockably mounted on the axle hangers 7. The front wheels 8 are of the caster type.

Anchor members 9 and 10 are fixedly mounted on the axle which constitutes an actuating rockshaft for the anchor members. In the embodiment illustrated the axle is provided with keyways 11 receiving the keys 12. The anchor member 9 projects above the axle and has a longitudinal slot 13 in its upper end. The bell crank lever 14 is pivotally mounted at 15 on the bracket 16 on the adjacent hanger and is provided with a pin 17 engaging the slot 13 so that on actuation of the bell crank lever the axle is actuated as a rockshaft and the anchor members swung to and from engaging position. In Figs. 1 and 2 they are shown by full lines in engaged position and in disengaged position by dotted lines. The anchor members have floor or deck engaging tips 18 preferably at their front edges providing relatively sharp points adapted to embed in the floor, deck or platform conventionally indicated at 19.

The bell crank lever is actuated from the actuating lever 20 pivoted at 21 on the hanger or bracket 22 at the forward end of the truck. This actuating lever is provided with a socket 23 adapted to receive the bar-like handle 24 which constitutes an extension for the lever. The swinging end of the actuating lever is connected by the coupling link 25 to the outer or forward end of the actuating slide or link 26 which is slidably mounted on the under side of the body, being supported in the embodiment illustrated by the base plate 27 of the caster. The castor 27 has a portion thereof spaced from the underside of the truck body to permit the link 26 to slide between the castor and the body.

The actuating slide or link 26 is connected by the second coupling link 28 to the bell crank lever by means of the pivot 29. The spring 30 is connected at one end to the truck body and at the other to the coupling link 28, the spring acting to return the anchors to disengaged position. It will be noted that the engaging points of the anchors are approximately in vertical alinement with the axle. It is not intended that the entire anchored load shall be carried by the anchor members but it is partially sustained by the carrying wheels.

To releasably hold the anchors in engaged position I provide a locking dog 31 which is pivoted at 32 on the body frame and extends forwardly to engage the pivot 33 connecting the coupling link 25 to the actuating lever. This pivot is extended to serve as a detent. The dog is urged to engaging position by the spring 34 and is provided with a socket 35 with which a tool as 36 may be engaged for releasing the dog.

With this arrangement of parts the anchors may be quite easily actuated to engaged position and the strain thereon is relatively light owing to their relationship to the wheels. The embodiment illustrated is highly practical, is simple and economical in its parts, and relatively light in weight, a feature of substantial advantage particularly where the trucks are used in shipment of freight.

I have not attempted to illustrate or describe other embodiments and adaptations which I contemplate as it is believed this disclosure will enable those skilled in the art to adapt the invention as may be desired.

Having thus described my invention, what I claim as new and desire to secure by Letters Patent is:

1. The combination with a truck body provided with axle hangers, an axle rockably mounted on said hangers, a wheel supporting sleeve on said axle, wheels on said sleeve, anchor members mounted on and fixed to said axle at the outer sides of the wheels, one of said anchor members extending above the axle and having a longitudinal slot in its upper end, a bell crank lever pivotally mounted on one of the axle hangers, one of its arms having a pin engaging the slot in the anchor member, an actuating lever pivotally mounted at one end of the body, an actuating slide mounted on said body, a coupling link connecting said actuating lever to the outer end of said actuating slide, a second coupling link connecting the inner end of said actuating slide to the other arm of said bell crank lever, a spring connected to said body and to said second coupling link for retracting the anchors, and a manually releasable spring biased locking dog pivotally mounted on the truck body to coact with said actuating lever when it is in actuated position for holding the anchors in their actuated position.

2. The combination with a truck body provided with axle hangers, an axle rockably mounted on said hangers, a wheel supporting sleeve on said axle, wheels on said sleeve, anchor members mounted on and fixed to said axle at the outer sides of the wheels, one of said anchor members extending above the axle and having a longidinal slot in its upper end, a bell crank lever pivotally mounted on one of the axle hangers, one of its arms having a pin engaging the slot in the anchor member, an actuating lever at one end of the body operatively connected to the other arm of said bell crank lever, a spring for retracting the anchors, and a manually releasable spring biased locking dog pivotally mounted on the truck body to coact with said actuating lever when it is in actuated position for holding the anchors in their actuated position.

3. The combination with a truck body provided with axle hangers, an axle rotatably mounted on said hangers, carrying wheels on said axle, anchors mounted on and fixed to said axle adjacent the wheels, one of said anchors having a longitudinal slot in its upper end, a bell crank lever pivotally mounted on one of the axle hangers, one of its arms having a pin engaging the slot in the anchor, an actuating lever mounted at one end of the body, an actuating slide mounted on said body and operatively connected to said actuating lever, a coupling link connecting the inner end of said actuating slide to the other arm of said bell crank lever, a spring for retracting the anchors, and a manually releasable spring biased locking dog operatively associated with said actuating lever for holding the anchors in their actuated position.

4. The combination with a truck body provided with axle hangers, an axle rotatably mounted on said hangers, carrying wheels on said axle, anchors mounted on and fixed to said axle adjacent the wheels, one of said anchors having a longitudinal slot in its upper end, a bell crank lever pivotally mounted on one of the axle hangers, one of its arms having a pin engaging the slot in the anchor, an actuating lever mounted at one end of the body and connected to the other arm of said bell crank lever, a spring for retracting the anchors, and a manually releasable spring biased locking dog operatively associated with said actuating lever for holding the anchors in their actuated position.

5. The combination with a truck body provided with carrying wheels and an axle therefor mounted to constitute a rockshaft, anchor members mounted on said axle adjacent the wheels, one of said anchor members being extended above the axle and having a longitudinal slot therein, a lever pivotally mounted on the body and having a pin engaging said slot, means for actuating said lever to actuate the anchors to engaging position, and a retracting spring for said anchors operatively connected to said lever.

6. The combination with a truck body provided with carrying wheels and a rockably mounted axle, anchor members mounted on said axle, one of said anchor members projecting above the axle, a bell crank lever having one arm slidably engaged with the upper end of said projecting anchor, and actuating means connected to the other arm of said lever.

7. The combination with a truck body provided with carrying wheels and a rockably mounted axle, anchors mounted on said axle, one anchor projecting above the axle, a pivoted lever having a slidable connection to the said projecting end, and means for actuating said lever.

EMERY G. ULRICH.

REFERENCES CITED

The following references are of record in the file of this patent:

UNITED STATES PATENTS

| Number | Name | Date |
|---|---|---|
| 850,414 | Bridsall | Apr. 16, 1907 |
| 938,720 | Stables | Nov. 2, 1909 |
| 1,306,385 | McNamara | June 10, 1919 |
| 1,691,140 | Thorner | Nov. 13, 1928 |
| 1,797,083 | Frank | Mar. 17, 1931 |